United States Patent [19]

Billiet et al.

[11] Patent Number: 4,838,905
[45] Date of Patent: Jun. 13, 1989

[54] FILTER ELEMENT AND METHOD OF MAKING A FILTER ELEMENT

[75] Inventors: Colin T. Billiet, Durham; Robert M. Fielding, Blyth; Stephen N. Smith, Sacriston, all of England

[73] Assignee: Domnick Hunter Filters Limited, County Durham, England

[21] Appl. No.: 92,673

[22] Filed: Sep. 3, 1987

[30] Foreign Application Priority Data

Sep. 9, 1986 [GB] United Kingdom ............... 8621660

[51] Int. Cl.⁴ .............................................. B01D 46/02
[52] U.S. Cl. ...................................... 55/486; 55/498; 55/520; 55/524; 156/86
[58] Field of Search ................. 55/498, 520, 528, 486, 55/DIG. 5; 156/86, 230, 239, 294

[56] References Cited

U.S. PATENT DOCUMENTS

| | | | |
|---|---|---|---|
| 2,396,712 | 3/1946 | Luttage et al. | 55/498 X |
| 4,017,401 | 4/1977 | Holz | 156/86 X |
| 4,102,785 | 7/1978 | Head et al. | 55/520 X |
| 4,564,376 | 1/1986 | Billiet | 55/498 X |
| 4,576,666 | 3/1986 | Harris et al. | 156/86 X |
| 4,631,098 | 12/1986 | Pithouse et al. | 156/86 |
| 4,661,314 | 4/1987 | Levine et al. | 156/86 X |

Primary Examiner—Charles Hart
Attorney, Agent, or Firm—Henry Sternberg; Bert J. Lewen

[57] ABSTRACT

A filter element comprises a relatively rigid fluid-permeable cylinder (5), around which is provided a body (7) of non-woven fibrous filter material. A jacket (6) of permeable material is positioned around the outer surface of the filter material, and is heat-shrunk onto the filter material in order to hold this under substantially uniform radial compression over the whole of its area.

11 Claims, 4 Drawing Sheets

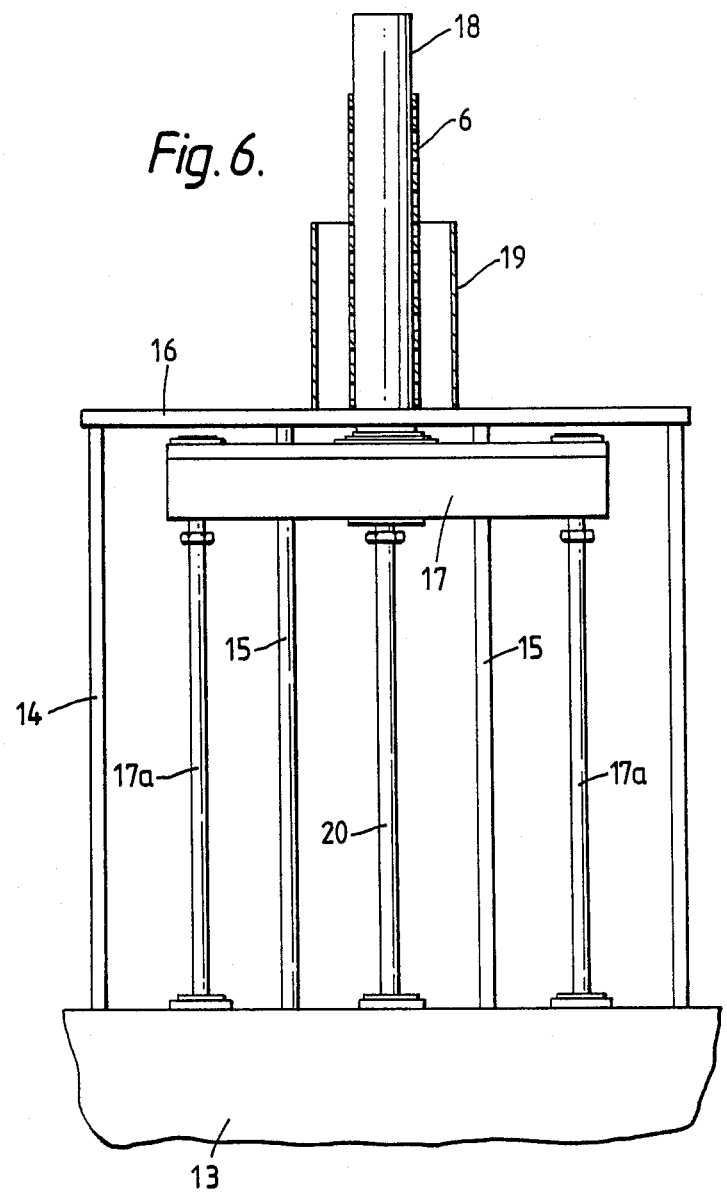

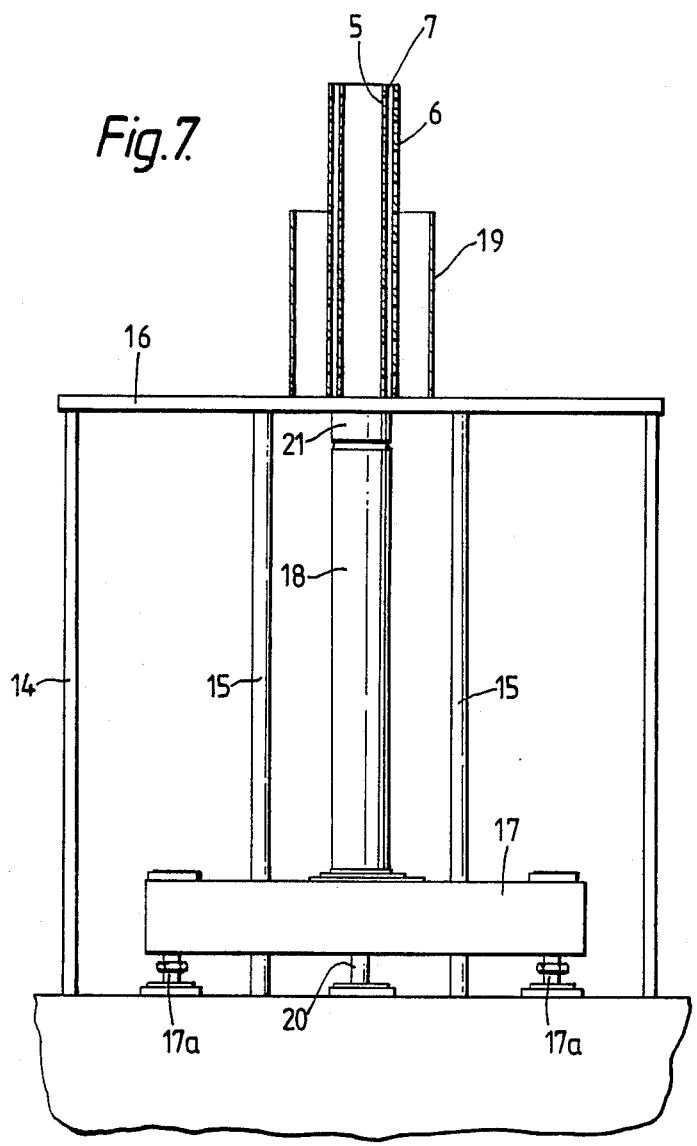

FILTER ELEMENT AND METHOD OF MAKING A FILTER ELEMENT

This invention relates to a filter element and to a method of making a filter element.

Filters for compressed air are known that have end caps sealed at opposite ends of a cylindrical wall that comprises a filter medium capable of effecting filtration of compressed air flowing radially through the wall. In filters where the air flow is from inside to outside the cylindrical wall, the compressed air to be filtered passes into the filter element through one of the end caps. Where the air flow is from outside to inside the cylindrical wall, the filtered air leaves the filter element through one of the end caps. In either arrangement the filter medium incorporated in the cylindrical wall is designed to effect the required type of filtration.

Perhaps the commonest use for this type of filter is in the removal of oil from compressed air. In this case, one of the filter mediums commonly used is an ultra high efficiency microporous filter paper that is manufactured from microfibre borosilicate glass fibres. Liquid, usually oil carried in the compressed air, coalesces during passage of the air through the filter paper and is allowed to drain from the filter, often through the medium of an anti reentrainment barrier positioned around the downstream side of the filter medium. The microporous filter papers used in such filters are in themselves weak, and are generally protected from rupture and from migration of fibres by sandwiching a plurality of layers of filter papers between layers of strong, fluid-permeable, flexible support material, typically nylon or polyester non-woven fabric. In turn, the support material is generally further supported by lying in contact with a relatively rigid foraminous reinforcing cylinder of metal or plastics material, at least on the downstream side of the filter assembly, but more usually on both sides of the filter assembly.

Filter constructions of this type have been successfully used for many years in the filtration of compressed air contaminated with oil aerosol. However, there is a constant demand for filter elements of high efficiency and low cost, and the invention provides a novel element that meets these requirements.

According to the invention a filter element comprises a relatively rigid, fluid-permeable cylinder, a body of non-woven fibrous filter material positioned around the outer surface of the cylinder, and a jacket positioned around the outer surface of the filter material, the jacket being of a permeable material that has been heat-shrunk on to the filter material in order to hold the filter material under substantially uniform radial compression over the whole of its area.

The invention thus provides a filter element wherein the filter material is retained on an inner cylinder by a heat-shrunk jacket which is much cheaper to provide than a conventional relatively rigid fluid-permeable cylinder of plastics or metal material. The jacket holds the filter material in even, uniform compression around the whole circumference thereof, and is seamless and hence uniformly strong in all radial directions. It can provide excellent resistance to burst pressures. The jacket does not promote flow channelling of gas through the filter material, so assisting in realizing the full filtration capacity.

The filter material may be a microporous material, and is preferably a non-woven borosilicate glass fibre material. The body of filter material may be formed in any one of a number of different ways, amongst which may be mentioned deposition of a suitable thickness of material from a slurry, for example as described in GB-A-No. 2,126,497; moulding microfibre by any suitable technique, including vacuum moulding techniques; the simple wrapping of a thick sheet of filter material around the cylinder; and the spiral winding of a thinner sheet of filter material around the outer surface of the cylinder to form a multi-layer body. In the latter case the layers of filter material may be alternated with layers of a stronger, fluid-permeable, flexible support material such as a nylon or polyester nonwoven fabric. However, in many instances it is preferred that successive spiral windings are in direct surface-to-surface contact one with the other, in other words that the support material that has hitherto been commonly used is omitted. Quite apart from further reducing the cost, it has surprisingly been found that the omission of this support material may significantly reduce pressure drop across the filter element, so broadening its range of use.

It has already been stated that it is common to use an anti re-entrainment barrier positioned around the downstream side of the filter medium, but in a filter element according to the invention it has been found that such barrier may be omitted, again with consequent cost reduction. Drainage of filtrate from the filter element can be sufficient to prevent filtrate being picked up from the downstream surface of the element, but the exact mechanism as to why this result can be achieved with the heat-shrunk jacket of the invention is not fully understood. However, an anti re-entrainment barrier could be provided, either externally of the jacket, or internally of the jacket and so subject to compression thereby.

Preferably the heat-shrunk jacket is of a woven fabric, and desirably the fabric is of synthetic fibre, the particular fibres being chosen so that they will be chemically inert to the environment in which the filter element is to operate. For example, fibres that may be used include polypropylene, polyethylene (including high density polyethylene), aramid fibres (for example Kevlar), polyester, nylon and rayon, and in each case the fibre may be a monofilament or multifilament fibre. The jacket may comprise identical fibres, or different fibres may be interwoven to form the jacket. For example, if the jacket is tubular-woven (as is preferred), with warp yarns extending longitudinally of the jacket and weft yarns extending circumferentially of the jacket, it is possible to select the warp and weft yarns such that the as-woven jacket is capable of greater shrinkage in the weft direction than in the warp direction. Indeed the warp yarns may have been previously heat set so that there is substantially zero shrinkage longitudinally of the jacket. Preferably, the weft yarns are capable of shrinking by up to 30% at temperatures of not more than 150° C.

The invention also relates to a method of making a filter element, and according to this aspect of the invention such method comprises providing a relatively rigid fluid-permeable cylinder, providing a body of nonwoven fibrous filter material around the outer surface of the cylinder, and providing a heat-shrunk jacket of a permeable material around the outer surface of the filter material, to hold the filter material under substantially uniform radial compression over the whole of its area.

One simple way of carrying out such a method is to position the as-woven jacket loosely, but closely, around the body of fibrous filter material, and then to heat the assembly so that the jacket shrinks on to the filter material. The filter material is compressed due only to the shrinkage of the jacket, and can be compressed by up to about 15% of its original thickness.

In an alternative arrangement, a method similar to that disclosed in GB-B-No. 2,128,497 may be used, and this method comprises placing the heat-shrinkable jacket around the outer surface of a rigid sleeve having inner and outer diameters that are each less than that of the original outer diameter of the body of filter material, the rigid sleeve having at one end thereof an end section tapering inwardly from an opening having an outer diameter greater than the original outer diameter of the body of filter material, forcing the body of filter material and inner cylinder axially into the rigid sleeve through the opening thereof to compress the filter material between the cylinder and the rigid sleeve, heating the assembly so that the jacket of heat-shrinkable material shrinks around the outer surface of the rigid sleeve, and axially removing the rigid sleeve while holding the cylinder and the heat-shrunk jacket axially in position. The jacket may be heat-shrunk on to the sleeve either before or after the body of filter material is compressed in the sleeve.

Using this method, the filter material is actually compressed by the rigid sleeve and the heat-shrunk jacket serves to hold the filter material in the compressed state after the rigid sleeve has been removed. In this way it is possible to obtain greater compression of the body of filter material, and compressions from 15% to 45%, and most desirably from 30% to 40% of the original thickness are desirably obtained. The compression figure is, in each case, given as the percentage by which the body of fibrous filter material is compressed in any sample wall section of the cylindrical filter element.

After formation of the filter element, it may be fitted with end caps using any one of a number of techniques, and the capped element may be incorporated into a filter system in any one of a number of different ways.

In order that the invention may be better understood a specific embodiment of a filter element in accordance therewith, and a method of making such a filter element, will now be described in more detail by way of example only, with reference to the accompanying drawings in which:

FIGS. 5 to 7 illustrate stages in a second method of manufacturing the element.

Figure 1:
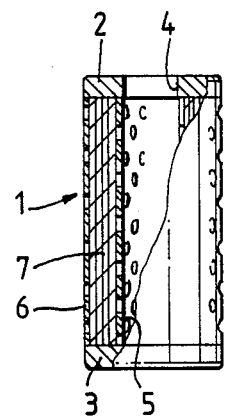
FIG. 1 is a schematic view of a filter element.

FIG. 1 shows a filter designed for the filtration of oil aerosol from compressed air. The filter comprises a cylindrical filter element 1, having end caps 2 and 3 sealed at opposite ends of the element. Such sealing may be effected in any one of a number of ways, the objective being to ensure that no leakage of air is possible through or around the axial end region of the cylindrical wall. For example, each end cap may have radially inner and outer flanges defining therebetween an annular groove within which the respective axial end of the cylindrical filter element is received. The groove has a width greater than the width of the element and a fluid-impervious sealant (typically an epoxy resin) is charged into this gap in order to fill the gap and to penetrate into the axial end regions of the element. Alternatively, a hot-melt technique may be used for sealing the end caps to the elements.

The filter is designed for an air flow from inside to outside, and the end cap 2 includes an air inlet 4 into the hollow body of the filter. The filter element includes an inner foraminous reinforcing cylinder 5. A body of nonwoven fibrous filter material 7 is positioned around the outer surface of the cylinder, and a jacket 6 is positioned around the outer surface of the filter material. The reinforcing cylinder 5 may conveniently be formed from perforated stainless steel, for example of 24 gauge thickness and with 40% open area, the cylinder being constructed to be circumferentially continuous, for example by forming a sheet into a cylinder and completing an axially extending weld along two abutting edges of the sheet.

Alternatively, the cylinder 5 may be an extrusion or moulding of a plastics material, for example polypropylene.

Figure 2:
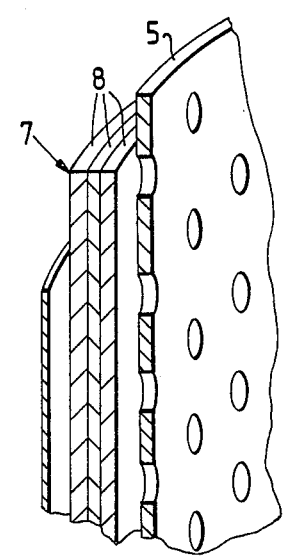
FIG. 2 is an enlarged cross-sectional view through part of the wall of the filter element.

FIG. 2 shows in detail the structure of the cylindrical filter element. A plurality of layers 8, each consisting of a single ply of non-woven fibrous filter material, are spirally wound around the reinforcing cylinder 5 as shown with reference to FIG. 3. The filter material is preferably a microporous material, and for most applications the preferred material is microfibre borosilicate glass sheet. Depending on the application, this may be impregnated with an organic binder, usually a synthetic resin binder, such as an acrylic, phenolic or epoxy resin. The uncompressed thickness of each microfibre layer may typically be from 0.4 mm to 1.0 mm. The number of layers of microporous material that need to be used depend upon the conditions for which the filter is designed and on the thickness of the individual layers. Constructions that will commonly be used will include three or more layers of microporous material.

The filter body that is formed by the layers of microporous material is radially surrounded by the jacket 6, which is a tubular-woven fabric jacket that has been heat-shrunk onto the outer surface of the filter body either to compress the filter body or to hold the filter body in a pre-compressed state. The jacket will be of fibres which are chemically inert to the conditions in which the filter is to be used, and will generally be of synthetic fibre. The fabric of the jacket, after heat-shrinking, is preferably of sufficiently small pore size so as to prevent migration through the jacket of fibres from the body of filter material. For removal of oil aerosol from a compressed air supply a suitable jacket is one woven from monofilament polyethylene warp yarns and multifilament polypropylene weft yarns, the weft yarns extending circumferentially around the jacket and being capable of greater shrinkage at a given temperature than are the warp yarns.

One particular example of jacket fabric in a tubular-woven, square weave fabric having 108 weft threads per inch (42.52 per cm), each weft thread being monofilament polyethylene of 0.25 mm diameter, and 50 warp threads per inch (1.96 per cm), each warp thread being multifilament normal tenacity polypropylene of 1200 denier, with a breaking tension of 400 g/denier. The polyethylene warp threads have been stabilised by pre-shrinking, the polypropylene weft threads can shrink by about 4% at a temperature of about 130° C. In an alternative arrangement the warp threads may be of heat-stabilised polypropylene multifilament and the weft threads of polyethylene monofilament, which is capable of 20% to 25% shrinkage at about 130° C.

It will particularly be noted that the filter element comprises just three components, the inner reinforcing cylinder, the body of filter medium and the heat-shrunk outer jacket. There is no need to include intermediate layers of reinforcing fabric between the plys that form the body of filter material, and there is no need to provide the usual anti re-entrainment barrier externally of the heat-shrunk jacket. Accordingly, the filter element is extremely economical.

Figure 3:
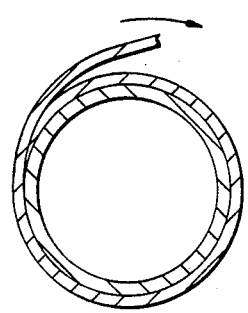
FIGS. 3 and 4 illustrate stages in a first method of manufacturing the element.
Figure 4:
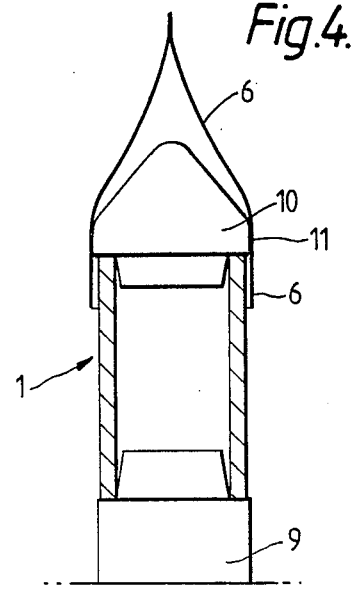

FIGS. 3 and 4 illustrate one method by which the filter element of FIGS. 1 and 2 can be made. An inner sleeve 5 of the required size is taken, and a sheet 7 of the required filter material is spirally wound around the cylinder for the required number of turns, the sheet being cut when winding is complete in a location such that the final cut edge is substantially in alignment with the leading edge of the sheet. Accordingly, a substantially constant thickness of filter material is present around the sleeve. The resulting assembly 1 is placed on a support 9, and a guide 10 is located on the upper part of the assembly. The guide member has a frustoconical upper section terminating in a region 11 that is of slightly greater diameter than the diameter of the body of filter material. The jacket of tubular-woven heat-shrinkable fabric 6 is then pulled downwardly over the guide 10 and the filter body into a position where it completely surrounds the filter body. In order to assist this operation the fibres used for the jacket may be chosen to have low friction in addition to the other required properties, or the jacket may be coated with a lubricant, either directly or picked up from a lubricant on the guide 10. When the jacket is in position the guide is removed, the assembly taken from the support 9 and placed in an oven at a controlled temperature suitable for effecting the required heat-shrinking of the jacket 6. As the jacket shrinks the body of filter material is compressed, and after cooling the shrunk jacket holds the filter material in the compressed condition. End caps can then be applied in any suitable manner.

In an alternative, the jacket may be sufficiently oversize and sufficiently stable for it simply to be slipped axially over the wound filter without the need to use a guide 10.

In either method, if it is required that the microfibre be resin impregnated then such impregnation is desirably effected after fitting the jacket, either before or after the jacket is heat-shrunk onto the filter material.

Figure 5:
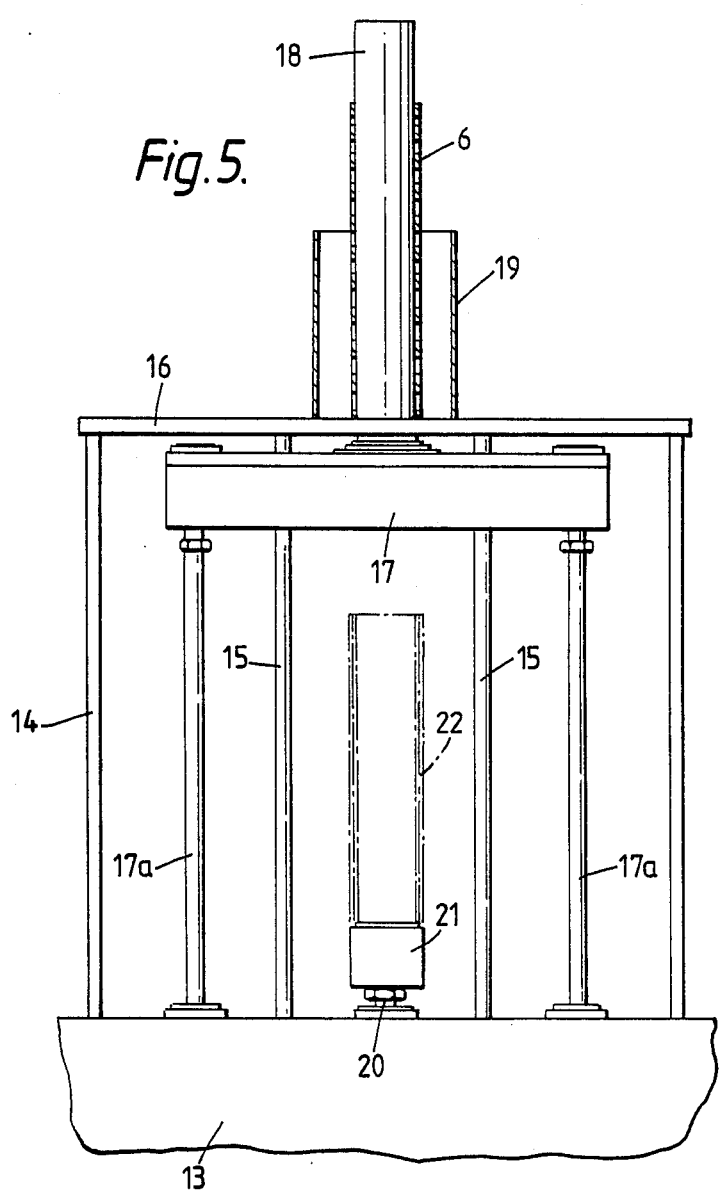

If a higher degree of compression of the filter material is required then the method illustrated with reference to FIGS. 5 to 7 may be used. The apparatus used comprises a fixed base 13 on which is mounted a frame 14. Vertical guides 15 extend between the top 16 of the frame and the base 13. A table 17 is guided by the guides 15 for vertical movement relative to the base, such movement being effected by vertical rams having piston rods 17a secured to the table and cylinders housed in the base 13. The upper surface of the table 17 has secured thereto a hollow, thin sleeve 18 having inner and outer diameters less than the outer diameter of the wound filter structure. The lower end of the sleeve 18 flares outwardly to its lower opening, the opening being of a diameter greater than the outer diameter of the wound filter structure. A cylindrical support 19 surrounds part of the sleeve 18. Coaxially with the sleeve, and below it, there is mounted a further vertically extending ram having a piston 20 on the upper end of which is secured a head 21 shaped to accommodate and support the lower end of the combination 22 of wound filter structure and inner cylinder.

To effect assembly, the lower end of this combination 22 is located on the head 21. The heat-shrinkable jacket 6 of the filter element is placed over the sleeve 18 as shown in FIG. 5, the inner diameter of the jacket being slightly greater than the outer diameter of the sleeve. With the table 17 and thus the sleeve 18 held in position the piston rod 20 is then moved upwardly to insert the filter structure into the jacket, radial compression of the filter structure occurring during this insertion as the structure passes progressively through the tapered lower part of the sleeve. When fully inserted to the position shown in FIG. 6 it will be seen that the whole of the filter structure has been radially compressed within the sleeve 18. Thereafter with the piston rod 20 held extended, the piston rods 17a are retracted. Thus, the table 17 and sleeve 18 are moved downwardly to the position shown in FIG. 7, during which movement the filter structure expands radially into contact with the inner surface of the jacket 6. The inner diameter of this jacket is chosen so that although some expansion occurs at this stage the filter structure is, nevertheless, compressed by the required percentage from its original thickness as formed on the inner cylinder 5. The final filter element assembly comprising the inner cylinder, filter body and jacket may then be removed from the head 21 for subsequent fitting of the end caps. The rams are then returned to their original positions shown in FIG. 4 ready for assembly of a further element.

In this method the jacket may either be heat-shrunk after its initial location around the sleeve 18, or it may be heat-shrunk after the assembly is removed from the head 21 and before fitting the end caps. The particular method used will in part depend on the ability of the as-woven tubular jacket to withstand the radially outwardly directed force that will occur when the sleeve 18 is removed from the compressed filter body, and the jacket weft threads will be chosen accordingly. If aramid fibre such as Kevlar is used for the weft threads then substantial radial forces can be resisted. If resin impregnation of the filter medium is required then this can be effected before or after fitting of the jacket.

In any of the methods of the invention the temperature at which heat-shrinking is effected must be sufficiently high to produce the required effect, but not high enough to cause any degradation of the jacket material or of any other body that may be heated with the jacket.

The foregoing examples describe manufacture using a filter body that has been wound on to an inner cylinder. It will be understood, however, that in alternative arrangements the filter body may be provided on the inner cylinder by deposition of fibres from a slurry or by moulding fibres around the outer surface of the inner cylinder by a vacuum or other appropriate moulding technique.

We claim:

1. A filter element comprising a relatively rigid, fluid-permeable cylinder, a body of non-woven fibrous filter material positioned around the outer surface of the cylinder, and a permeable jacket positioned around the outer surface of the filter material, the jacket being in the form of a tubular-woven fabric sleeve having weft yarns extending circumferentially of the jacket and warp yarns extending longitudinally of the jacket, the warp yarns and the weft yarns having different shrinkage characteristics, the jacket having been heat-shrunk on to the filter material, with the weft yarns having undergone greater shrinkage than the warp yarns during the heat-shrinking, and due to said shrinkage holding the filter material under substantially uniform radial compression over the whole of its area.

2. Element of claim 1 in which the weft yarns have undergone shrinkage of up to 30%.

3. Element of claim 1 in which the warp yarns are heat-stabilized before being woven into the fabric sleeve such that the warp yarns have undergone substantially zero shrinkage during the heat shrinking of the jacket.

4. Element of claim 1 in which the filter material is a microporous material formed into a radially compressible body.

5. Element of claim 4 in which the filter material is non-woven borosilicate glass fiber material.

6. Element of claim 1 in which the body of filter material is formed by spirally winding a sheet of filter material around the outer surface of the cylinder.

7. Element of claim 6 in which successive windings are in direct surface-to-surface contact one with the other.

8. Element of claim 1 in which the fabric is of synthetic fiber.

9. A method of making a filter element, comprising the steps of providing a relatively rigid fluid-permeable cylinder, providing a body of non-woven fibrous filter material around the outer surface of the cylinder, said body being capable of undergoing radial compression, providing a jacket in the form of a permeable, tubular-woven fabric sleeve having warp yarns and weft yarns with different shrinkage characteristics, positioning said jacket loosely, but closely, around the body of fibrous filter material, so that the weft yarns extend circumferentially around the jacket, heating the resulting assembly so that the jacket shrinks on to and radially compresses the filter material with the weft yarns shrinking more than the warp yarns during the heat shrinking, and cooling the assembly so that the jacket holds the filter material under substantially uniform radial compression over the whole of its area.

10. Method of claim 9 in which the heat-shrinking is effected at a temperature not exceeding 150° C. and the weft yarns shrink by up to 30%.

11. A method of making a filter element, comprising the steps of providing a relatively rigid fluid-permeable cylinder, providing a body of non-woven fibrous filter material around the outer surface of the cylinder, placing a permeable heat-shrinkable jacket around the outer surface of a rigid sleeve having inner and outer diameters that are each less than that of the original outer diameter of the body of filter material, the rigid sleeve having at one end thereof an end section tapering inwardly from an opening having an outer diameter greater than the original outer diameter of the body of filter material, forcing the body of filter material and inner cylinder axially into the rigid sleeve through the opening thereof to compress the filter material between the cylinder and the rigid sleeve, heating the assembly so that the jacket of heat-shrinkable material shrinks around the outer surface of the rigid sleeve, and axially removing the rigid sleeve while holding the cylinder and the heat-shrunk jacket axially in position.

* * * * *